(12) United States Patent
Zheng

(10) Patent No.: US 7,558,093 B1
(45) Date of Patent: Jul. 7, 2009

(54) POWER CONVERTER WITH EMULATED PEAK CURRENT MODE CONTROL

(75) Inventor: Junjie Zheng, Santa Clara, CA (US)

(73) Assignee: iWatt Inc., Los Gatos, CA (US)

( * ) Notice: Subject to any disclaimer, the term of this patent is extended or adjusted under 35 U.S.C. 154(b) by 321 days.

(21) Appl. No.: 11/558,286

(22) Filed: Nov. 9, 2006

Related U.S. Application Data

(60) Provisional application No. 60/735,522, filed on Nov. 10, 2005.

(51) Int. Cl.
   *H02M 3/24* (2006.01)
   *H02M 7/44* (2006.01)
   *H02M 3/335* (2006.01)

(52) U.S. Cl. ............... 363/97; 363/21.12; 363/21.13; 363/21.16; 363/21.18

(58) Field of Classification Search ......... 323/282–285; 363/20–21.18, 74, 97, 79
See application file for complete search history.

(56) References Cited

U.S. PATENT DOCUMENTS

| | | | | |
|---|---|---|---|---|
| 6,532,161 B2* | 3/2003 | Kovalevskii et al. | ........... | 363/55 |
| 6,545,882 B2* | 4/2003 | Yang | ........................ | 363/21.08 |
| 6,882,552 B2* | 4/2005 | Telefus et al. | .................. | 363/97 |
| 6,958,920 B2* | 10/2005 | Mednik et al. | ................. | 363/19 |
| 7,030,512 B2* | 4/2006 | Krein | ........................... | 307/77 |
| 7,170,763 B2* | 1/2007 | Pai et al. | .................. | 363/21.16 |
| 7,239,117 B2* | 7/2007 | Lee et al. | ..................... | 323/283 |
| 7,411,378 B2* | 8/2008 | Lathrop et al. | ............... | 323/283 |
| 2002/0057080 A1* | 5/2002 | Telefus et al. | ............... | 323/283 |
| 2006/0043954 A1* | 3/2006 | Markowski | ................. | 323/283 |

* cited by examiner

*Primary Examiner*—Kiesha L Rose
*Assistant Examiner*—Fred E Finch, III
(74) *Attorney, Agent, or Firm*—Fenwick & West LLP

(57) ABSTRACT

A power converter includes a switch controller generating a pulse signal controlling a switch to emulate peak current mode control. The switch controller generates a control voltage from a representation of an output voltage of the power converter and a reference voltage. Based on the control voltage and a representation of an input voltage of the power converter, the switch controller determines a peak current in that switching cycle. If the peak current detected exceeds a maximum peak current, an on-time of the pulse signal in the next switching cycle is decreased. The power converter also provides short circuit or overload protection by increasing an off-time of the pulse signal until the off-time exceeds a transformer reset time of a transformer. If the switch period increased to prevent short circuit or overload exceeds a limit, the pulse signal is shut off immediately.

22 Claims, 10 Drawing Sheets

POWER CONVERTER WITH EMULATED PEAK CURRENT MODE CONTROL

CROSS-REFERENCE TO RELATED APPLICATION

This application claims priority under 35 U.S.C. §119(e) to co-pending U.S. Provisional Patent Application No. 60/735,522 entitled "Digital Off-Line Low-Power Supply Controller," filed on Nov. 10, 2005, which is incorporated by reference herein in its entirety.

BACKGROUND OF THE INVENTION

1. Field of the Invention

The present invention relates generally to a power converter, and more specifically, to a power converter emulating a peak current mode control where on-times of the switch for coupling or decoupling a load to or from a power source is determined by a primary peak current of the power converter.

2. Description of the Related Art

Control schemes for controlling power converters include, among other schemes, peak current mode control. The peak current mode control is a control scheme especially advantageous to high power applications. In the peak current mode control scheme, a power converter controller detects the primary current in a primary side of the power converter and controls the duty cycle of a pulse signal in the primary side of a transformer turning a switch on and off in order to regulate the secondary output voltage and current.

FIG. 1 shows a schematic diagram of a conventional flyback power converter 100 operating in the peak current mode. The power converter of FIG. 1 includes, among other components, a DC power source 102, a transformer 120, a switch Q1, a pulse signal generator 110, a diode 122 coupled to the secondary winding 138 of the transformer 120, and a capacitance $C_o$ 124, a sense resistor $R_{sense}$ 140, and a comparator 116. The DC power source 102 provides a DC input voltage of Vg. The transformer 120 includes a primary winding 136 and a secondary winding 138. The switch Q1 is coupled to the primary winding 136 of the transformer 120. The voltage $V_{IP}$ 128 across the sense resistor $R_{sense}$ 140 represents a current in the primary side of the transformer 120. The pulse signal generator 110 receives a clock signal 134 for generating a pulse signal 114 to the switch Q1. The sense resistor 140 is placed between the switch Q1 and ground. The comparator 116 generates an output signal $V_{comp}$ 126 in response to a voltage $V_{IP}$ across the sense resistor $R_{sense}$ 140 and a control voltage $V_c$ 142 generated by an integrator 118. The control voltage $V_c$ 142 represents an integrated value of an error voltage between a reference voltage $V_{ref}$ 132 and a scaled output voltage Vo. The peak current mode control is accomplished by the comparator output signal $V_{comp}$ 126 turning high when the voltage $V_{IP}$ 128 reaches a threshold defined by the control voltage $V_c$ 142, which in turn resets the pulse signal generator 110 and turns off the switch Q1. In the conventional power converter, the pulse signal generator 110, the comparator 116, and the integrator 118 are integrated into a switching controller chip 150.

FIG. 2 shows a timing diagram for signals of the conventional power converter 100 of FIG. 1. Referring to FIGS. 1 and 2, after a switching cycle is started by a clock signal 210, the pulse signal generator 110 generates a pulse signal 114 that alternately turns the switch Q1 on and off. The duration of on-times and off-times of the switch Q1 is controlled so that the power converter operates in peak current mode control. Specifically, the voltage $V_{IP}$ satisfies the equation of $V_{IP}$=Vg/ $L_M \times T$ (where $L_M$ is the magnetizing inductance of the transformer 120, and T is the time period during which the switch is turned on). Therefore, the voltage $V_{IP}$ 128 (representing the primary current $i_p$) rises linearly during an on-time $T_{on1}$ until it reaches the control voltage $V_c$ 142, at which point the comparator output signal $V_{comp}$ 126 turns high 220. The high pulse 220 in a comparator signal $V_{comp}$ 126 resets the pulse signal generator 110. Once the pulse signal generator 110 is reset, the switch Q1 is turned off for the remaining switching cycle $T_{off1}$. Another clock signal 212 restarts the subsequent switching cycle (denoted by $T_{on2}$ and $T_{off2}$) of the pulse signal generator 110.

Short circuit protection and overload protection can be implemented in the conventional power converter by setting a maximum control voltage Vc(max). As shown in FIG. 2, if the load is short-circuited or overloaded after a first switching cycle (denoted by $T_{on1}$ and $T_{off1}$), Vc may increase in the second switching cycle (denoted by $T_{on2}$ and $T_{off2}$). If Vc is allowed to increase without setting a limit, the transformer 120 may fail to reset and saturation of the transformer may occur after a number of switching cycles. The saturation of the transformer can in turn cause an excessive current in the switch Q1 and damage the switch Q1. In the conventional power converter operating in the peak current mode control, however, Vc is not increased above Vc(max) in the second switching cycle; and therefore, the on-time $T_{on2}$ of the switch Q1 does not extend beyond a certain limit. Because the on-time $T_{on}$ is not increased beyond the limit, saturation of the transformer 120 is prevented even when short-circuit or overload of the load occurs.

In order to implement peak current mode control, the resistor $R_{sense}$ 140 is used to sense the primary peak current $i_p$. The resistor $R_{sense}$ 140 for sensing the primary peak current $i_p$, however, reduces efficiency and reliability of the power converter 100, increases the size of the power converter and adds cost to manufacturing of the power converter. A typical $R_{sense}$ resistor 140 required for a 5 watt power converter is in the range of 1 to 3 ohms. The power loss from the sense resistor $R_{sense}$ equals $I_{P\_RMS}^2 \times R_{sense}$ (where $I_{P\_RMS}$ is RMS (Root Mean Square) current in the sense resistor $R_{sense}$), and this accounts for about 2% efficiency loss in the power converter. Moreover, the resistor $R_{sense}$ reduces the reliability of the power converter because the $R_{sense}$ consumes a large amount of power and generates heat.

Therefore, there is a need for a power converter that can emulate a peak current mode control without using a resistor to sense the primary current. There is also a need for a power converter that can increase the efficiency and reliability of the peak current mode control while reducing the size and cost of manufacturing the power converter.

SUMMARY OF INVENTION

An embodiment of the present invention includes a power converter including a switch controller that can emulate peak current mode control without using a resistor to sense a primary peak current of the power converter. Specifically, the power converter according to an embodiment of the present invention detects the primary peak current from a representation of an input voltage and a control voltage to emulate the peak current mode control. The control voltage is an integration of an error voltage between a reference voltage and a representation of an output voltage of power converter. Based on the detected peak current, the power converter generates a pulse signal for a second switching cycle subsequent to a first switching cycle so that the primary peak current does not exceed a maximum limit.

In an embodiment of the present invention, a digital logic of the switch controller generates a pulse signal for controlling on-times and off-times of the switch based on a digital representation of the input voltage and the control voltage. The digital logic may increase the on-time of the pulse signal in the second switching cycle when the control voltage is greater than the digital representation of the input voltage. When the digital representation of the input voltage is greater than the control voltage, the digital logic decreases the on-time of the pulse signal in the second switching cycle.

In an embodiment of the present invention, short circuit or overload protection to avoid saturation of a transformer in the power converter is provided. The short circuit or overload protection may be accomplished by comparing a transformer reset time of the transformer with the off-time of the switch in the first switching cycle. When the transformer reset time is longer than the off-time of the switch in the first switching cycle, a switching period of the second switching cycle is increased to allow the transformer to reset in the second switching cycle.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present invention can be readily understood by considering the following detailed description in conjunction with the accompanying drawings.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 2:
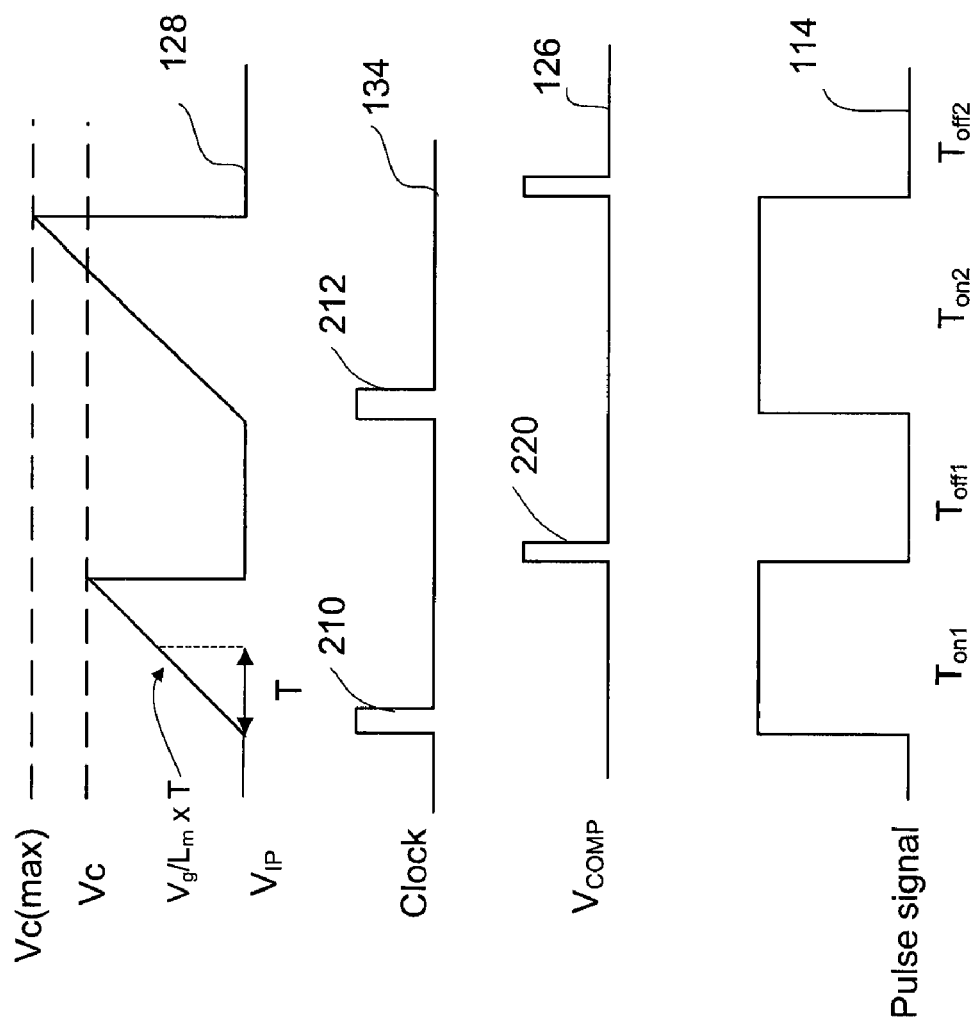
FIG. 2 is a timing diagram illustrating signals of the conventional power converter of FIG. 1.

The present invention is based on an insight that an on-time $T_{on}$ of the switch in a switching cycle is a function of an input voltage Vg and a control voltage Vc. As explained above with reference to FIG. 2, when the switching device Q1 is turned on in a conventional power converter operating in a peak current mode control, the primary current $i_p$ through the sense resistor $R_{sense}$ increases linearly during the on-time $T_{on}$ of the switch Q1. Such increase in the primary current $i_p$ is detected by a commensurate increase in the voltage $V_{IP}$ across the sense resistor $R_{sense}$. In the conventional power converter, when $V_{IP}$ reaches the control voltage Vc, the switch Q1 is turned off. At this point, $V_c$ equals $V_{IP}$ and the following equations are satisfied:

$$V_c = V_{IP} = i_p \times R_{sense} \quad (1)$$

$$i_p = \frac{Vg \times T_{on}}{L_M} \quad (2)$$

(where $L_M$ is the magnetizing inductance of a transformer). From equations (1) and (2), the following equation may be derived.

$$T_{on} = \frac{Vc}{Vg} \times \frac{L_M}{R_{sense}} \quad (3)$$

Equation (3) indicates that the on-time $T_{on}$ of the switch is proportional to $$Vc \times \frac{L_M}{R_{sense}}$$

but inversely proportional to the input voltage Vg. Here, if a constant k is defined as:

$$k = \frac{L_M}{R_{sense}} \quad (4)$$

the on time $T_{on}$ can be expressed by the following equation:

$$T_{on} = \frac{Vc}{Vg} \times k \quad (5)$$

Equation (5) shows that the duration of the on-time $T_{on}$ of the switch can be modulated as a function of the control voltage Vc (which represents an integration of an error between the sensed output voltage $V_{sense}$ and a reference voltage $V_{REF}$ for a number of switching cycles) and the input voltage Vg. Based on equations (1) to (5), a power converter can emulate peak current mode control without using the sense resistor $R_{sense}$ as described in more detail with FIG. 3.

The power converter of an embodiment of the present invention is an "emulation" of the peak current mode control because the peak primary current is not sensed directly from a voltage across a sense resistor $R_{sense}$ but determined from a scaled input voltage and a difference between the representation of the output voltage and the reference voltage. The scaled input voltage and the representation of the output voltage are sampled in the first switching cycle. Moreover, the power converter is an emulation of the peak current mode control in the sense that the primary peak current determined in the first switching cycle controls the on-time of the switch in a second switching cycle but not the on-time of the switch in the first switching cycle.

Figure 3:
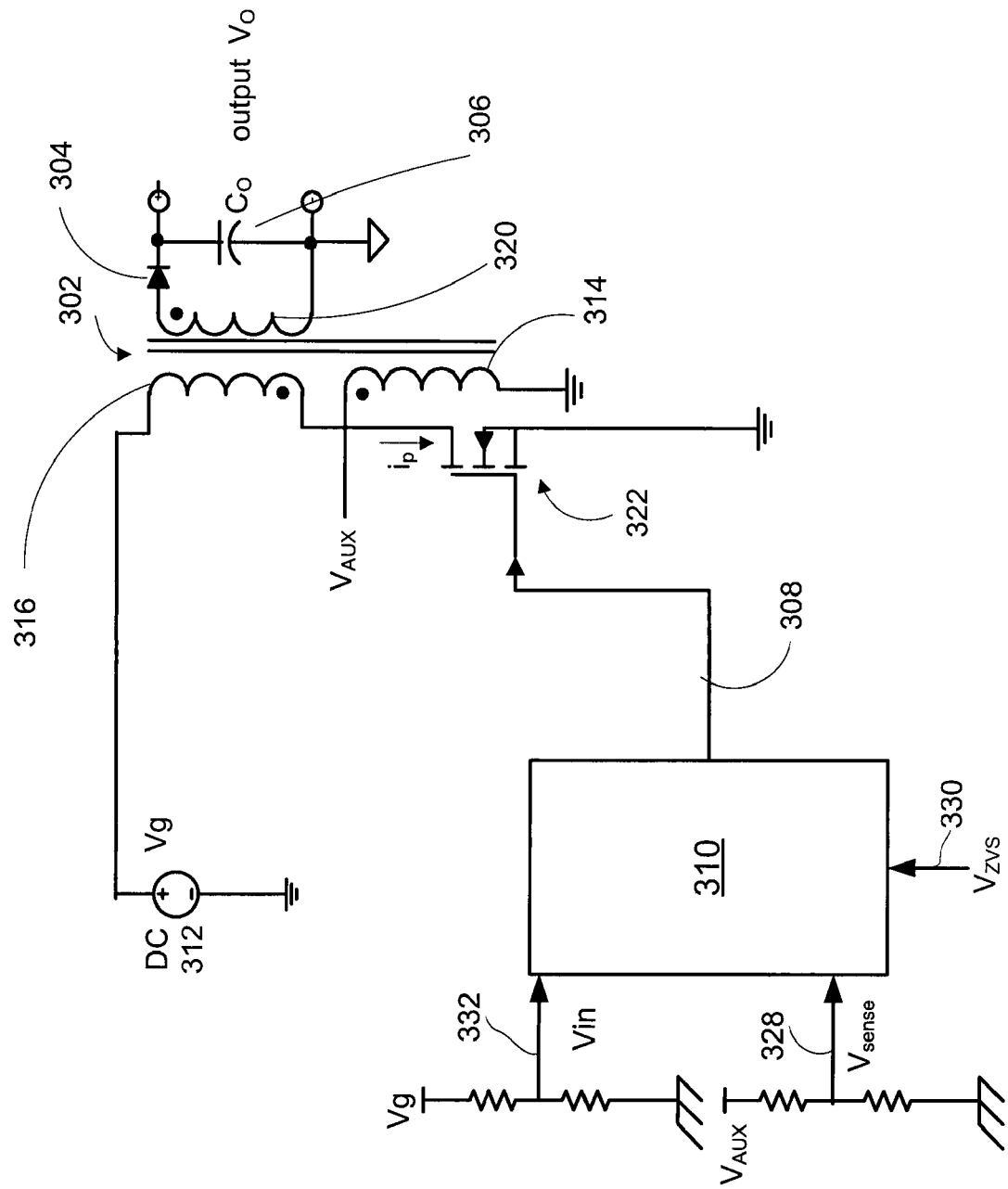
FIG. 3 is a schematic illustrating a power converter emulating peak current mode control according to one embodiment of the present invention.

FIG. 3 illustrates a flyback power converter with primary-side sensing according to one embodiment of the present invention. Although the power converter of FIG. 3 is a flyback converter with primary side sensing of the feedback signals, it should be noted that the present invention is not limited to a flyback converter and that it can be applied to any type of power converter of any topology. The power converter includes, among other components, a transformer 302, a switch 322, an output rectifier diode 304, an output filter capacitor 306, and a switch controller 310. The switch controller 310, which is explained in more detail with reference to FIG. 4, controls the opening and closing of the switch 322 using its pulse signals 308 with on-times $T_{on}$ and off-times $T_{off}$. When the switch 322 is turned on because the pulse signal 308 is high during the on-time, energy from a DC (direct current) voltage source 312 (having an output voltage of Vg) is stored in the primary windings 316 of the transformer 302 because the diode 304 is reverse biased. When the switch 322 is turned off, the energy stored in the primary windings 316 of the transformer 302 is released to the secondary winding 320 of the transformer 302 because the diode 304 becomes forward biased. The diode 304 rectifies the output voltage on the secondary windings 320 of the transformer 302 and the capacitor 306 filters the output voltage signal on the secondary windings 320 of the transformer 302.

In one embodiment, the power converter operates in an emulated peak current mode control by controlling the duration of the on-times $T_{on}$ and off-times $T_{off}$ of the switch 322. As will be explained in more detail with reference to FIGS. 4 and 5, the switch controller 310 generates the pulse signal 308 based on an input voltage $V_{in}$ which is a scaled down voltage from the input voltage Vg by a factor of k (i.e., $V_{in}$=Vg/k), a divided-down voltage $V_{sense}$ of the reflected secondary voltage $V_{AUX}$ sensed on the auxiliary windings 314 of the transformer 302, and a zero voltage switching voltage $V_{ZVS}$ which is set slightly above ground. In one embodiment, the zero voltage switching voltage $V_{ZVS}$ is set to 0.2V.

Figure 4:
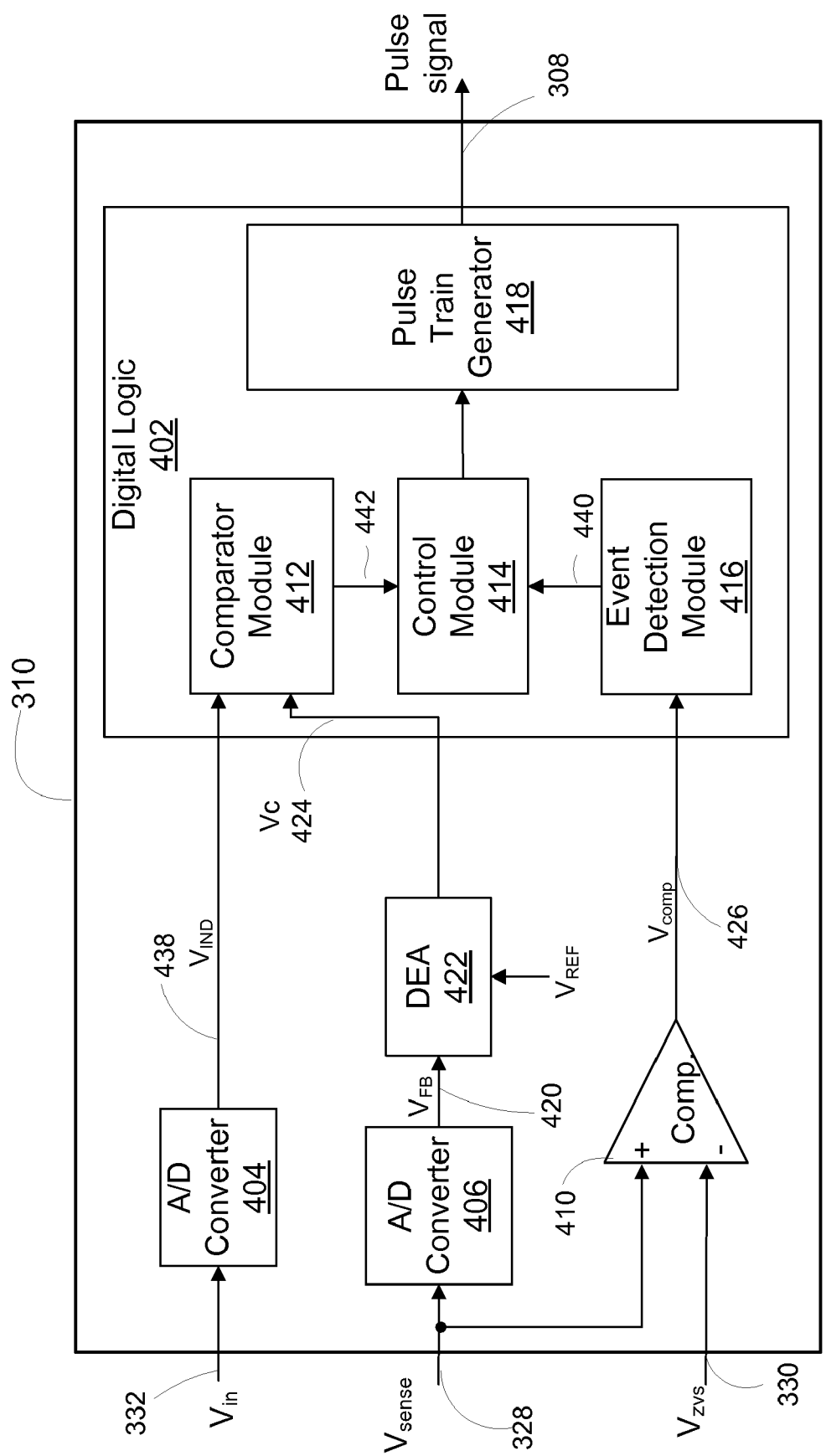
FIG. 4 is a block diagram illustrating the switch controller of the power converter according to one embodiment of the present invention.

FIG. 4 is a block diagram illustrating the switch controller 310 of the power converter of FIG. 3. The switch controller 310 according to one embodiment of the present invention includes, among other components, a first analog-to-digital (A/D) converter 404, a second A/D converter 406, a comparator 410, and a digital logic 402. The first A/D converter 404 converts the input voltage $V_{in}$ 332 to a digital signal $V_{IND}$ 438 so that $V_{IND}=V_{in}\times(n\times LSB/Volt)$ where n×LSB/Volt is the digital resolution of the converter. The second A/D converter 406 generates a digital feedback voltage signal $V_{FB}$ 420 from the sensed output signal $V_{sense}$ 328. The digital feedback voltage signal $V_{FB}$ 420 is sent to an input of a digital error amplifier (DEA) 422. The DEA 422 then generates a control signal Vc 424.

The digital logic 402 of the switch controller 310 includes, among other modules, a comparator module 412, a control module 414, an event detection module 416, and a pulse train generator 418. The comparator module 412 receives the digital version of the input signal $V_{IND}$ 438 in the first switching cycle, and the control signal $V_c$ 424 in the first switching cycle. The digital logic 402 can be implemented in any form of digital circuitry, including digital logic gates or a microprocessor with software embedded therein.

Figure 5:
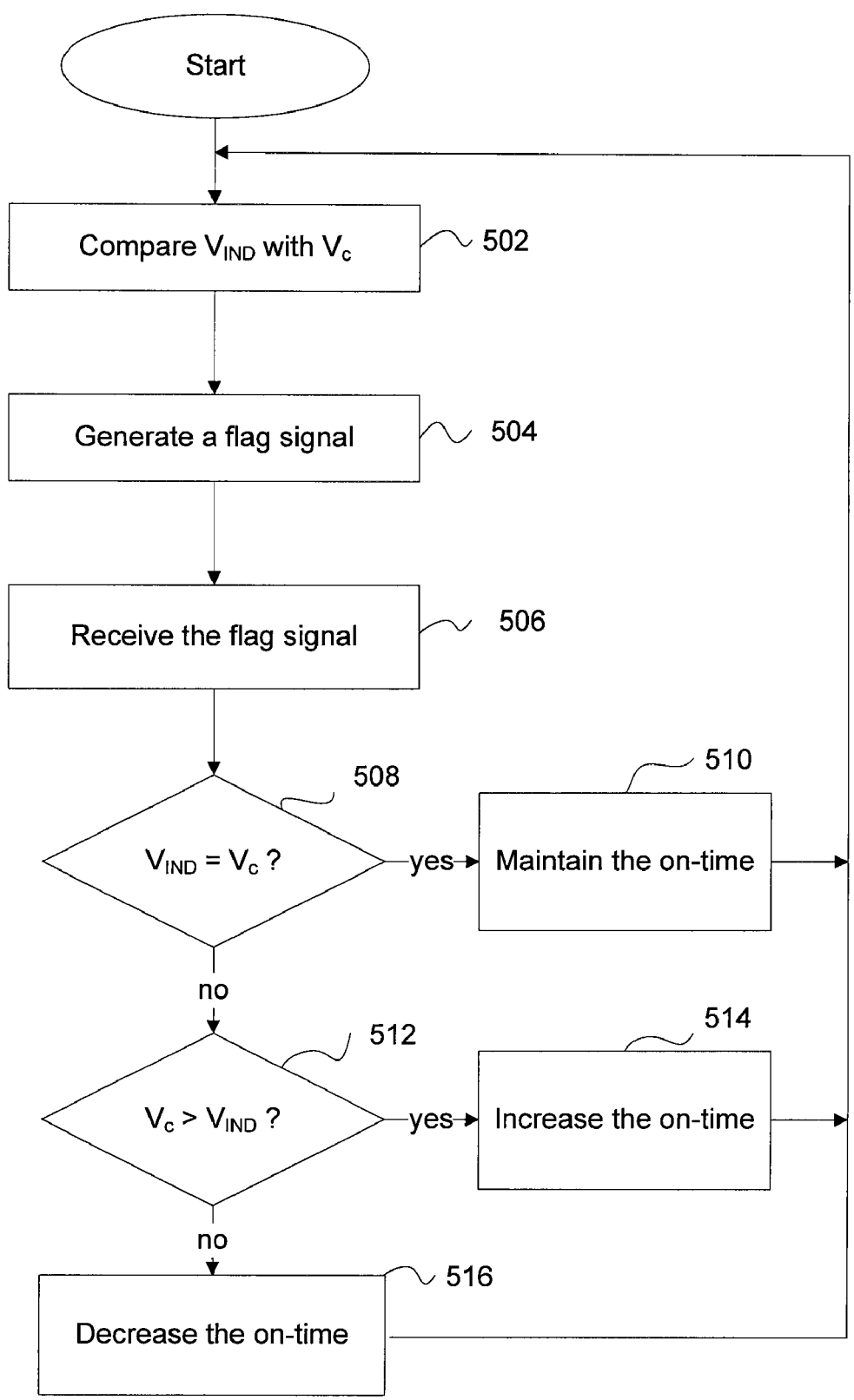
FIG. 5 is a flow chart showing a method of controlling on-times of the pulse signal to emulate the peak current mode control according to one embodiment of the present invention.

FIG. 5 is a flow chart showing a method of controlling on-times of the pulse signal to emulate the peak current mode control according to one embodiment of the present invention. A method for emulating the peak power control mode will now be explained with reference to FIGS. 4 and 5. The comparator module 412 compares 502 the digital version of the input signal $V_{IND}$ 438 with the control signal $V_c$ 424 to generate 504 a flag signal 442 that indicates whether the two signals are identical, and if not, which of the two signals is greater. In another embodiment, the flag signal 442 may further indicate the difference between the two signals. The control module 414 receives 506, among other signals, the flag signal 442 and determines 508 whether the input signal $V_{IND}$ 438 and the control signal $V_c$ 424 are identical. When $V_{IND}$ 438 and $V_c$ 424 are identical ($V_{IND}=V_c$), the on-time of the pulse signal 308 is maintained 510 in the second switching cycle. Then the process returns to step 502 to repeat steps 510 to 508 in the next switching cycle. If $V_{IND}$ 438 and $V_c$ 424 are not identical, the control module 414 determines 512 which of the two signals is greater. When the flag signal 442 indicates that $V_c$ 424 is greater than $V_{IND}$ 438 ($V_c>V_{IND}$), the control module 414 increases 514 the on-time of the pulse signal 308 generated by the pulse train generator 418 in the second switching cycle Then the process returns to step 502 to repeat steps 510 to 508 in the next switching cycle. Conversely, when the flag signal 442 indicates that $V_c$ 424 is smaller than $V_{IND}$ 438 ($V_c<V_{IND}$), the control module 414 decreases 516 the on-time $T_{on}$ of the pulse signal 308 generated by the pulse train generator 418 in the second switching cycle. Then the process returns to step 502 to repeat steps 510 to 508 in the next switching cycle.

Figure 8:
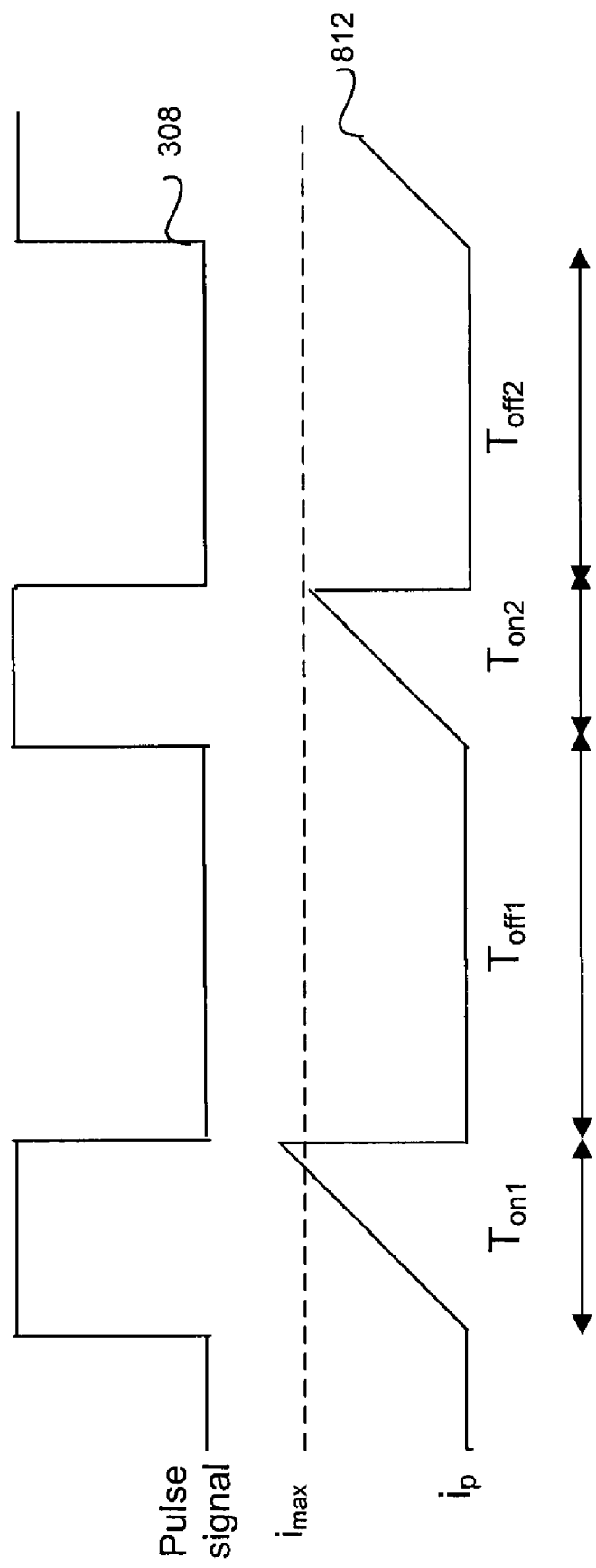
FIG. 8 is a timing diagram showing the on-times of the pulse signal adjusted to emulate peak current mode control.

FIG. 8 shows an example of signals in a power converter of FIG. 4 during a normal operation in the peak current control mode. In FIG. 8, $T_{on1}$ indicates the on-time of the pulse signal 308 in the first switching cycle. $T_{off1}$ indicates the off-time of the pulse signal 308 in the first switching cycle. $T_{on2}$ indicates the on-time of the pulse signal 308 in the second switching cycle. $T_{off2}$ indicates the off-time of the pulse signal 308 in the second switching cycle. In this example, the on-time $T_{on1}$ of the pulse signal 308 in the first switching cycle was set too long, causing the primary peak current $i_p$ 812 (during $T_{on1}$) to exceed the maximum peak current $i_{max}$ established for the peak current mode control. When the comparator module 412 compares the control signal $V_c$ 424 with the digital version of the input voltage $V_{IND}$ 438 in the first switching cycle, the digital version of the input voltage $V_{IND}$ 438 will be greater than the control signal $V_c$ 424. Hence, the control module 414 decreases the on-time $T_{on2}$ in the second switching cycle ($T_{on2}<T_{on1}$). The decreased on-time $T_{on2}$ of the second switching cycle will lower the primary peak current $i_p$ in the second switching cycle below the maximum peak current $i_{max}$. Conversely, if the on-time $T_{on1}$ of the first switching cycle was set too short, the peak primary current $i_p$ will fall short of the maximum peak current $i_{max}$. In this case, the control voltage $V_c$ 424 will be greater than the digital version of the input voltage $V_{IND}$ 438. Therefore, the control module 414 increases the on-time $T_{on2}$ of the second switching cycle ($T_{on2}>T_{on1}$). The on-time and off-time of the switch is controlled in this manner throughout the operation of the power converter. Various control algorithms may be employed to determine the incremental or decremental step size for increasing or decreasing the off-time of the switching cycle.

By increasing and decreasing the on-time of the pulse signal 308 in a switching cycle, the primary peak current $i_p$ in that switching cycle can be adjusted according to above Equation (2). Although the primary peak current $i_p$ does not directly turn off the switch in an embodiment of the present invention, the switch controller 310 operating in a high frequency will emulate the peak current mode control by controlling the on-time of the switch in a second switching cycle based on the primary peak current $i_p$ determined in a first switching cycle.

Figure 1:
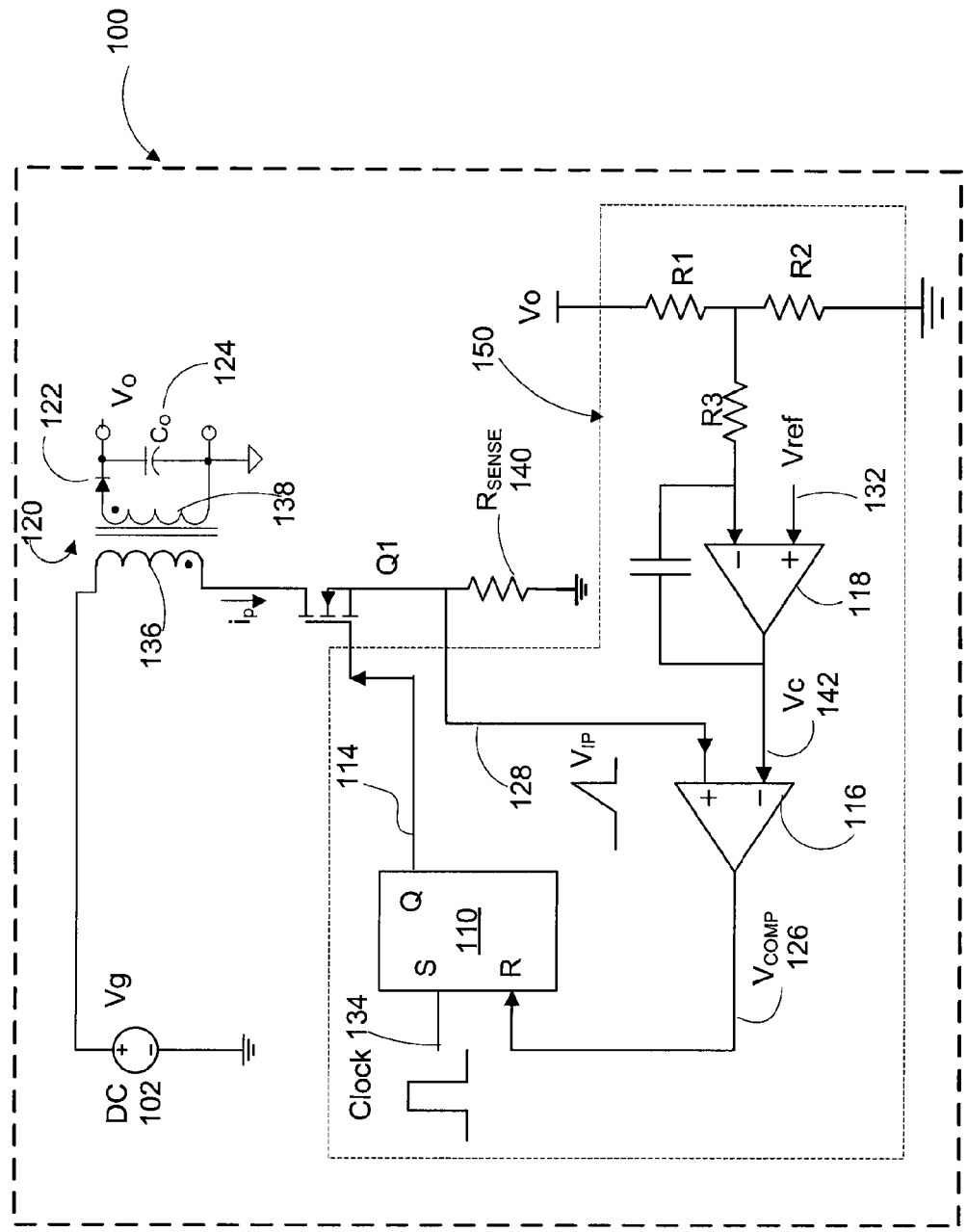
FIG. 1 is a schematic illustrating a conventional power converter operating in peak current mode control.

Components for providing short circuit or overload protection in the power converter in one embodiment will now be explained with reference to FIG. 4. Because the power converter does not include a sense resistor $R_{sense}$ and a comparator (e.g. the comparator 126 of FIG. 1), a mechanism different from conventional power converters must be provided to prevent short circuit or overload of the load. In one embodiment, the short circuit or overload prevention is achieved by, among other components, the comparator 410, the event detection module 416 and the control module 414.

Figure 6:
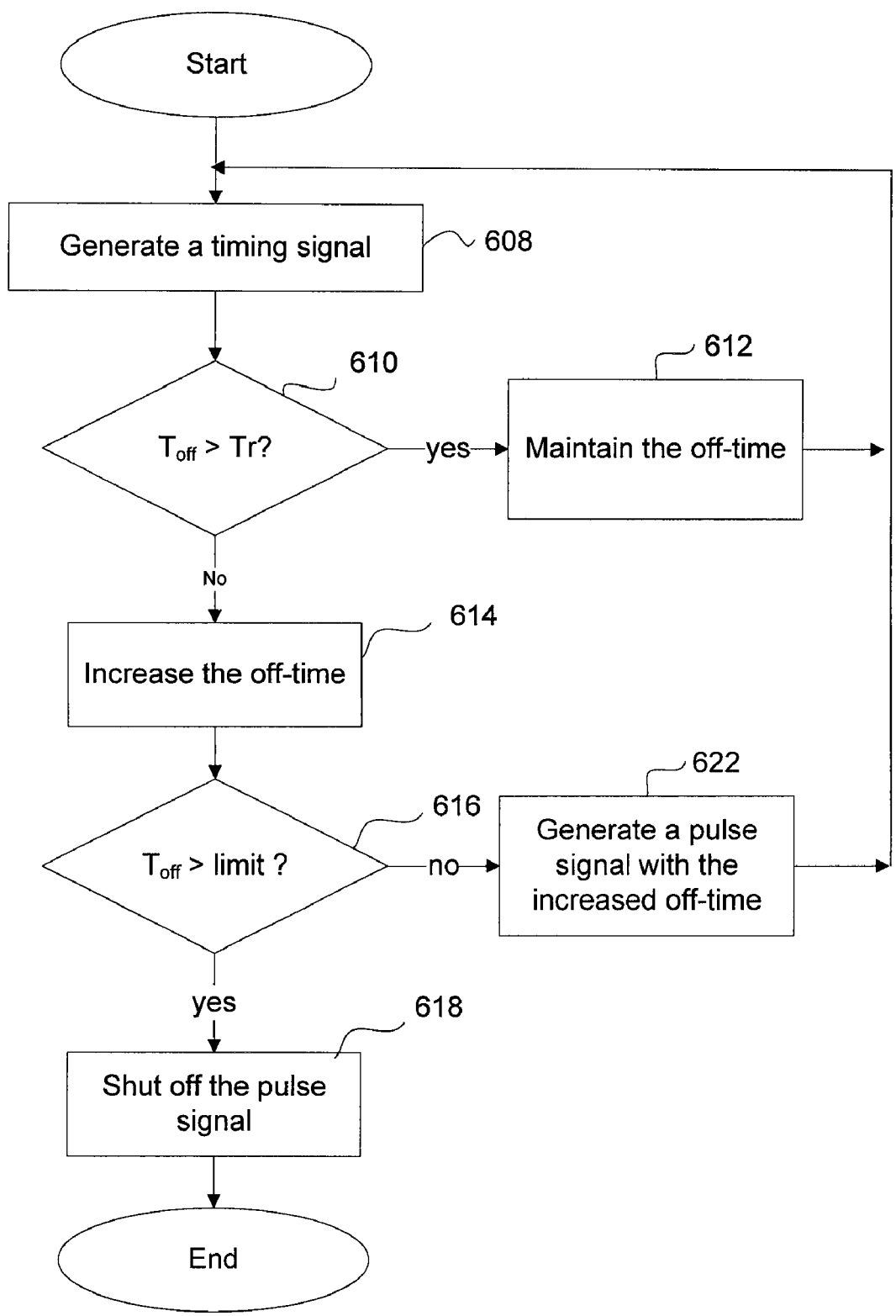
FIG. 6 is a flow chart showing a method of preventing saturation of a transformer according to one embodiment of the present invention.

FIG. 6 is a flow chart showing a method of providing short-circuit or overload protection using these components. The event detection module 416 generates 608 a timing signal 440 representing the transformer reset time Tr as described below in detail with reference to FIG. 6. The control module 414 compares 610 Tr (represented by the timing signal 440) to the off-time $T_{off}$ of the pulse signal 308 in the first switching cycle. When the off-time $T_{off}$ is greater than the transformer reset time Tr, the off-time $T_{off}$ is maintained 612 in the second switching cycle to allow the transformer 302 reset within the switching cycle. Conversely, when the off-time $T_{off}$ is smaller than the transformer reset time Tr, the off-time $T_{off}$ is increased 614 in the second switching cycle. In one embodiment, the off time $T_{off}$ of the pulse signal 308 is increased by 6 μs. Then, the control module 414 determines 616 if the increased off-time $T_{off}$ in the second switching cycle exceeds a certain limit. In one preferred embodiment, the limit is 75 μs. If the limit is exceeded, the control module 414 shuts off 618 immediately. If the limit is not exceeded, a pulse signal with the increased off-time is generated 622. Then the process returns to creating 608 the timing signal.

Figure 7:
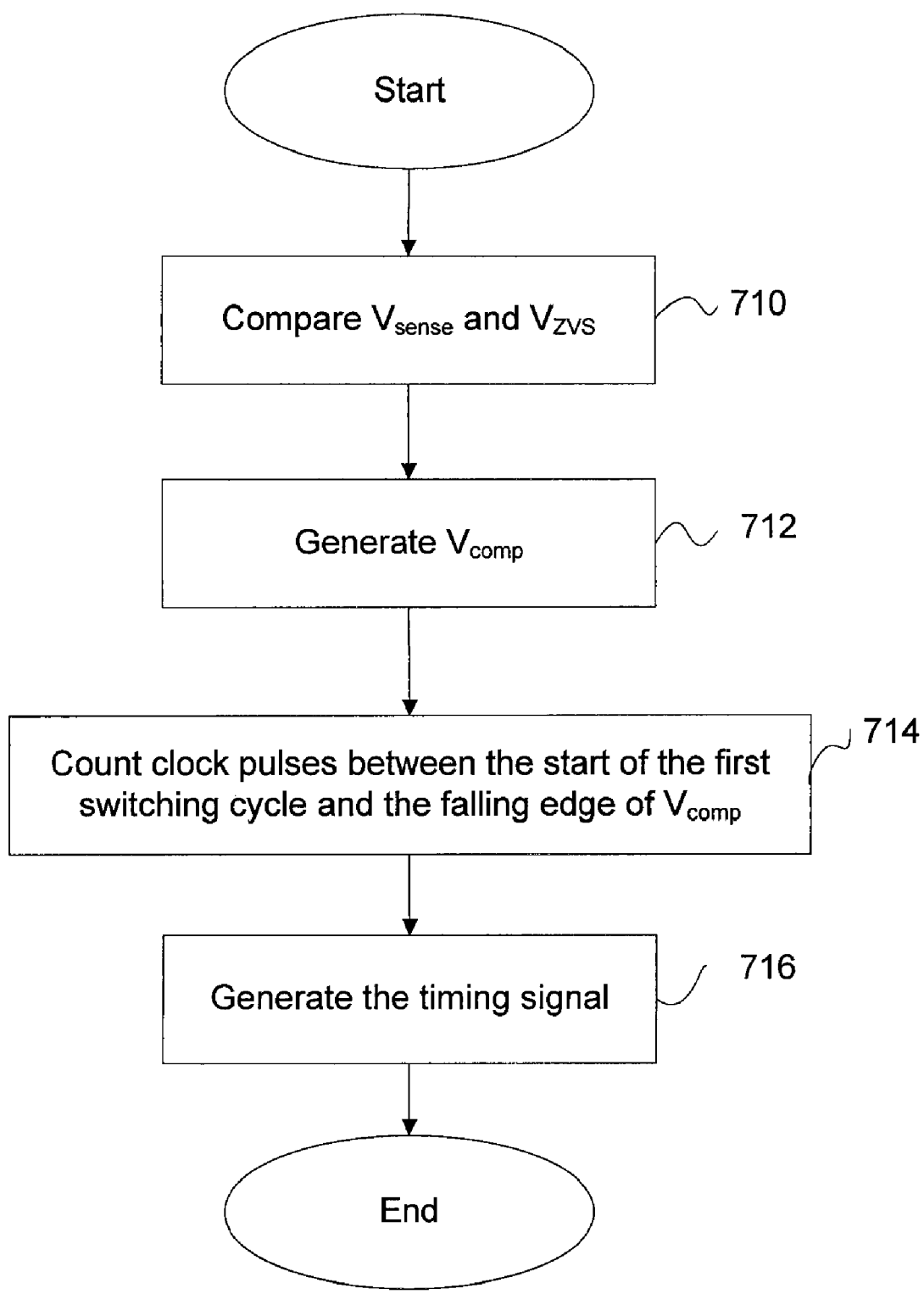
FIG. 7 is a flow chart showing a method of generating a timing signal according to one embodiment of the present invention.

FIG. 7 is a flow chart showing the steps of generating 608 the timing signal 440 in an embodiment of the present invention. The comparator 410 compares 710 the sensed output voltage $V_{sense}$ 328 with the zero voltage switching voltage $V_{ZVS}$ 330 and generates 712 the comparator signal $V_{comp}$ 426. The comparator signal $V_{comp}$ 426 turns low when $V_{sense}$ 328 drops lower than the zero voltage switching voltage $V_{ZVS}$ 330. The event detection module 416 counts 714 the number of internal clock pulses (note that this is not a switching cycle) between the start of the first switching cycle and the time at which a falling edge of the comparator signal $V_{comp}$ 426 is detected. From the number of clock pulses, the event detection module 416 generates 716 the timing signal 440 that indicates a transformer reset time Tr of the transformer 302 during the first switching cycle. Various other embodiments for detecting the transformer reset time may be employed. For example, the output voltage of the power converter can be detected directly from the secondary side of the power converter, and then transmitted to the switch controller through an opto-coupler.

Figure 9:
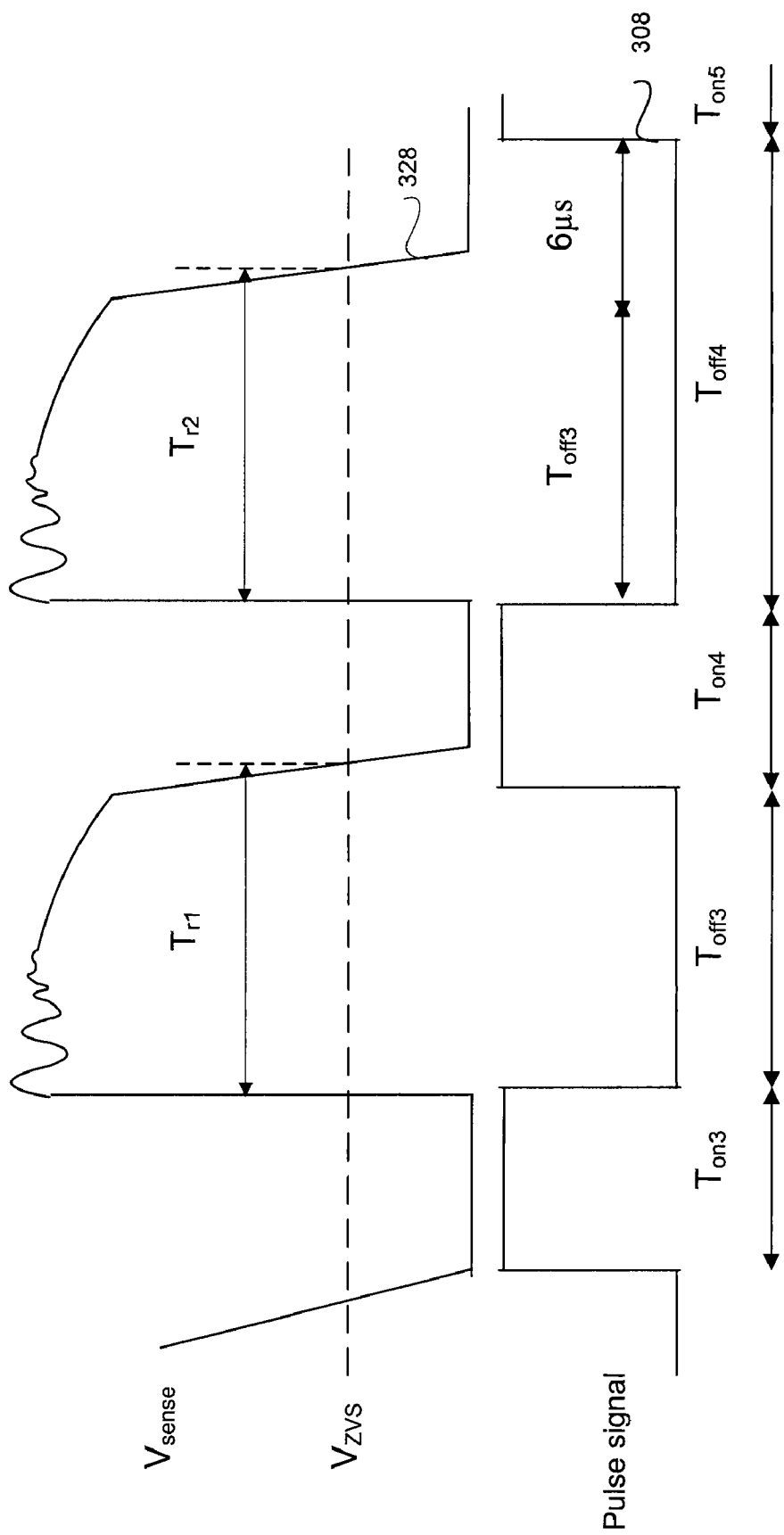
FIG. 9 is a timing diagram showing off-times of a switching cycle adjusted to prevent saturation of the transformer.

Referring to FIG. 9, an example of increasing the off-time $T_{off}$ of a switching cycle is illustrated. During a first switching cycle (denoted by $T_{on3}$ and $T_{off3}$), the load of the power converter is short-circuited or overloaded. As a result, the sensed output voltage $V_{sense}$ 328 spikes and a transformer reset time $T_{r1}$ of the transformer 302 exceeds the off time $T_{off1}$ of the pulse signal 308 in the first switching cycle. If the off-times of the subsequent switching cycles are not increased, the transformer 302 may saturate and cause damage to the switch 322. Therefore, the switch controller 310 increases the off-time $T_{off4}$ of the pulse signal 308 in the second switching cycle (denoted by $T_{on4}$ and $T_{off4}$) by a predetermined amount of time, in this example by 6 μs. By increasing the off time $T_{off4}$ of the pulse signal 308 in the second switching cycle, the off time $T_{off4}$ in the second switching cycle is now longer than the transformer reset time $T_{r2}$ in the second switching cycle. If the off-time $T_{off4}$ were shorter than the transformer reset time $T_{r2}$ even after the off-time was increased, the off-time $T_{off5}$ (not shown) in the third switching cycle is again increased by the predetermined amount of time (e.g., 6 μs).

Figure 10:
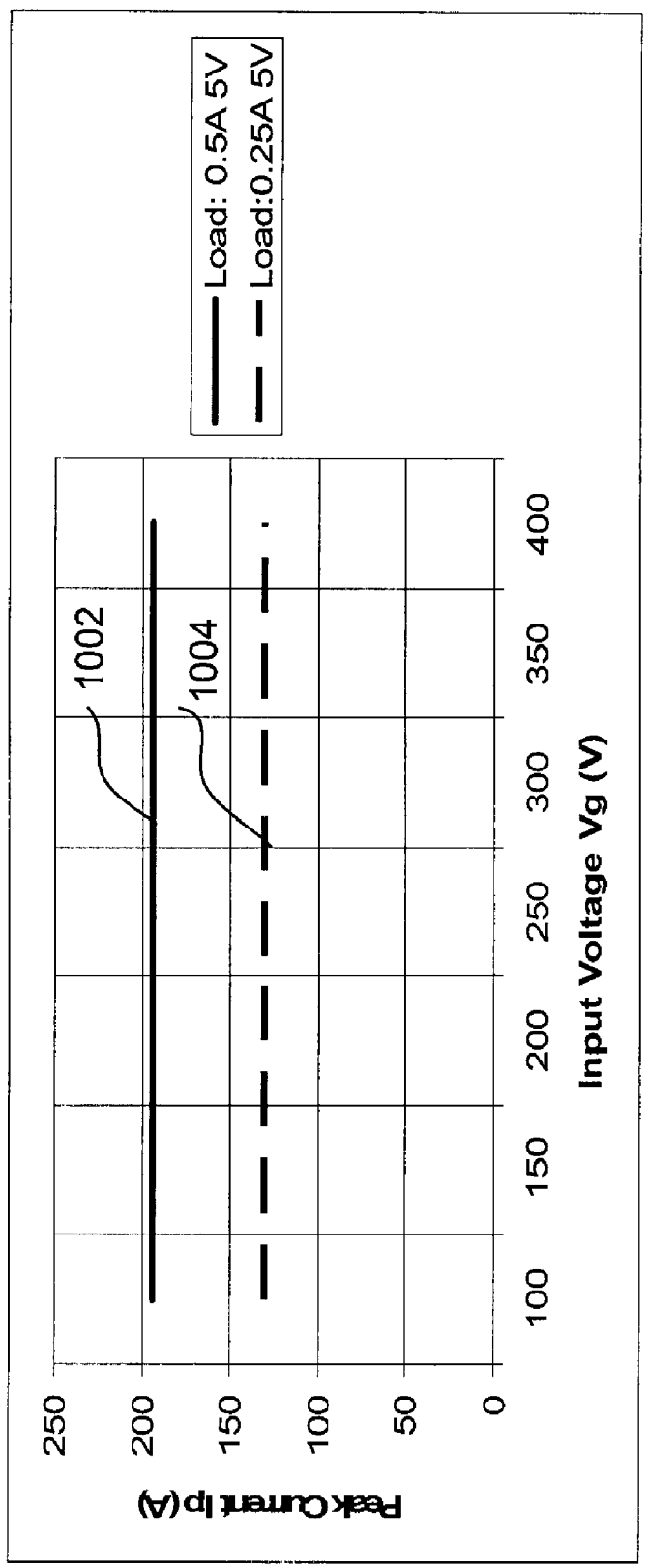
FIG. 10 shows the primary peak current of the power converter according to one embodiment subject to different load conditions.

FIG. 10 is a graph showing a experimental result of the power converter according to one embodiment of the present invention. The peak primary current $i_p$ of the power converter under different load conditions is illustrated. As can be seen from the horizontal lines 1002 and 1004, the peak current $i_p$ stays constant with the input voltage Vg changing from 100 Vdc to 400 Vdc.

Although the present invention has been described above with respect to several embodiments, various modifications can be made within the scope of the present invention. Accordingly, the disclosure of the present invention is intended to be illustrative, but not limiting, of the scope of the invention, which is set forth in the following claims.

What is claimed is:

1. A power converter emulating peak current mode control, the power converter comprising:
    a switch that electrically couples or decouples a load to or from a power source; and
    a switch controller coupled to the switch for controlling on-times and off-times of the switch, the switch controller determining an on-time of the switch in a second switching cycle subsequent to a first switching cycle based on a primary peak current of the power converter in the first switching cycle, the switch controller determining the primary peak current by comparing a representation of an input voltage of the power converter sampled in the first switching cycle with a control voltage representing an integration of an error voltage between a representation of an output voltage of the power converter and a reference voltage for a predetermined number of switching cycles.

2. The power converter of claim 1, wherein the switch controller includes:
    a digital logic for generating a pulse signal for controlling an on-time and an off-time of the switch in the second switching cycle based on a digital representation of the input voltage and the control voltage.

3. The power converter of claim 2, wherein the digital logic comprises:
    a comparator module for comparing the control voltage to the digital representation of the input voltage; and
    a control module coupled to the comparator module for increasing the on-time of the pulse signal in the second switching cycle responsive to the control voltage being greater than the digital representation of the input voltage and decreasing the on-time of the pulse signal in the second switching cycle responsive to the digital representation of the input voltage being greater than the control voltage.

4. The power converter of claim 1, wherein the switch controller compares the sampled output voltage of the power converter to a zero voltage switching voltage and generates a comparator signal, the switch controller determining a transformer reset time of a transformer coupled between the switch and the load in the first switching cycle based on a falling edge of the comparator signal.

5. The power converter of claim 1, wherein the switch controller increases a switching period of the second switching cycle responsive to a transformer reset time in the first switching cycle being longer than the off-time of the switch in the first switching cycle.

6. The power converter of claim 1, wherein the switch controller increases a switching period in the second switching cycle by increasing the off-time of the switch in the second switching cycle without changing the on-time of the switch in the second switching cycle.

7. The power converter of claim 1, wherein the switch controller shuts off a pulse signal controlling the on-time and off-time of the switch in the second switching cycle responsive to a switching period of the second switching cycle increased to reach a predetermined limit.

8. A power converter emulating peak current mode control, the power converter comprising:
a switch that electrically couples or decouples a load to or from a power source;
a transformer coupled between the switch and the load; and
a switch controller coupled to the switch for controlling on-times and off-times of the switch based on a primary peak current of the power converter the primary peak current determined by comparing a representation of an input voltage of the power converter sampled in a first switching cycle with a control voltage representing an integration of an error voltage between a representation of an output voltage of the power converter and a reference voltage for a predetermined number of switching cycles, the switch controller increasing a switching period of a pulse signal to the switch in a second switching cycle subsequent to the first switching cycle in response to a transformer reset time of the transformer being longer than an off-time of the switch in the first switching cycle, the transformer reset time determined from the representation of the output voltage of the power converter.

9. The power converter of claim 8, wherein the switch controller further includes a comparator for comparing the sampled representation of the output voltage of the power converter to a zero voltage switching voltage.

10. The power converter of claim 9, wherein the switch controller detects a falling edge of the comparator signal to determine the transformer reset time.

11. The power converter of claim 8, wherein the switch controller increases the switching period in the second switching cycle by increasing the off-time of the switch in the second switching cycle without changing the on-time of the switch in the second switching cycle.

12. The power converter of claim 8, wherein the switch controller shuts off the pulse signal in the second switching cycle responsive to the switching period increased to reach a predetermined limit.

13. A switch controller for controlling on-times and off-times of a switch that electrically couples or decouples a load to or from a power source in a power converter, the switch controller comprising:
a digital logic for generating a pulse signal to the switch in a second switching cycle subsequent to a first switching cycle based on a primary peak current of the power converter in the first switching cycle, the digital logic determining the primary peak current by comparing a representation of an input voltage of the power converter sampled in the first switching cycle with a control voltage representing an integration of an error voltage between a representation of an output voltage of the power converter and a reference voltage for a predetermined number of switching cycles.

14. The switch controller of claim 13, wherein the digital logic comprises:
a comparator module for comparing the control voltage to a digital representation of the input voltage of the power converter in the first switching cycle and generating a digital flag signal; and
a control module coupled to the comparator module for increasing an on-time of the pulse signal in the second switching cycle responsive to the digital flag signal indicating that the control voltage is greater than the digital representation of the input voltage, the control module decreasing the on-time of the pulse signal in the second switching cycle responsive to the digital signal indicating that the digital representation of the input voltage is greater than the control voltage.

15. The switch controller of claim 14, the switch controller further comprising a comparator for comparing the sampled output voltage of the power converter to a zero voltage switching voltage, the digital logic comprising an event detection module coupled to the comparator to determine a transformer reset time of a transformer coupled between the switch and the load in the first switching cycle.

16. The switch controller of claim 15, wherein the switch controller increases the switching period in the second switching cycle responsive to the transformer reset time being longer than the off-time of the switch in the first switching cycle.

17. The switch controller of claim 16 wherein the switch controller increases the switching period in the second switching cycle by increasing the off-time of the switch in the second switching cycle.

18. The switch controller of claim 16, wherein the switch controller shuts off the pulse signal in the second switching cycle responsive to the increased switching period reaching a predetermined limit, and resumes the pulse signal responsive to the switch controller receiving the representation of the output voltage of the power converter lower than the zero voltage switching voltage for a predetermined number of switching cycles.

19. A method for controlling on-times and off-times of a switch that electrically couples or decouples a load to or from a power source to emulate peak current mode in a power converter, the method comprising:
determining a primary peak current in a first switching cycle by comparing a representation of an input voltage of the power converter with a control voltage, the control voltage representing an integration of an error voltage between a representation of an output voltage and a reference voltage for a predetermined number of switching cycles; and
generating a pulse signal to couple or decouple a load to or from a power source in a second switching cycle subsequent to the first cycle, the pulse signal having an on-time determined from the primary peak current of the power converter in the first switching cycle.

20. The method of claim 19, further comprising:

increasing the on-time of the pulse signal in the second switching cycle responsive to the control voltage being greater than the digital representation of the input voltage; and decreasing the on-time of the pulse signal in the second switching cycle responsive to the digital representation of the input voltage being greater than the control voltage.

21. The method of claim 20, wherein the method further comprises increasing a switching period of the second switching cycle responsive to a transformer reset time of a transformer being longer than an off-time of the switch in the first switching cycle.

22. The method of claim 21, wherein the method further comprises shutting off the pulse signal in the second switching cycle responsive to the increased switching period reaching a predetermined limit.

\* \* \* \* \*